(12) United States Patent
Waschk

(10) Patent No.: US 8,087,591 B2
(45) Date of Patent: Jan. 3, 2012

(54) METHOD FOR PRODUCING A PORTABLE DATA CARRIER

(75) Inventor: Volker Waschk, Grünwald (DE)

(73) Assignee: Giesecke & Devrient GmbH, Munich (DE)

( * ) Notice: Subject to any disclaimer, the term of this patent is extended or adjusted under 35 U.S.C. 154(b) by 990 days.

(21) Appl. No.: 11/628,847

(22) PCT Filed: Jun. 7, 2005

(86) PCT No.: PCT/EP2005/006104
§ 371 (c)(1),
(2), (4) Date: Jan. 28, 2008

(87) PCT Pub. No.: WO2005/122072
PCT Pub. Date: Dec. 22, 2005

(65) Prior Publication Data
US 2008/0135625 A1    Jun. 12, 2008

(30) Foreign Application Priority Data
Jun. 9, 2004    (DE) .......................... 10 2004 028 218

(51) Int. Cl.
*G06K 19/06*    (2006.01)

(52) U.S. Cl. ........................................ 235/492; 235/487

(58) Field of Classification Search .................. 235/492, 235/487, 441; 361/736, 737, 760
See application file for complete search history.

(56) References Cited

U.S. PATENT DOCUMENTS

| | | | |
|---|---|---|---|
| 4,709,254 A | 11/1987 | Haghiri-Tehrani et al. | |
| 4,803,542 A | 2/1989 | Haghiri-Tehrani et al. | |
| 4,961,893 A | 10/1990 | Rose | |
| 5,030,407 A | 7/1991 | Mollet et al. | |
| 6,196,459 B1 * | 3/2001 | Goman et al. | 235/380 |
| 6,241,153 B1 * | 6/2001 | Tiffany, III | 235/488 |
| 6,308,894 B1 | 10/2001 | Hirai et al. | |
| 6,323,064 B1 * | 11/2001 | Lee et al. | 438/117 |
| 6,575,375 B1 | 6/2003 | Boccia et al. | |
| 7,121,473 B2 * | 10/2006 | Boker | 235/492 |
| 7,389,920 B2 * | 6/2008 | Rodgers | 235/385 |
| 2002/0179702 A1 * | 12/2002 | Fischbacher | 235/376 |

FOREIGN PATENT DOCUMENTS

| | | |
|---|---|---|
| DE | 30 29 667 A1 | 3/1982 |
| DE | 44 01 588 A1 | 7/1995 |
| DE | 199 08 285 A1 | 8/2000 |
| EP | 0 340 100 A1 | 4/1989 |

(Continued)

OTHER PUBLICATIONS

International Search Report dated Sep. 15, 2005 established in International Application No. PCT/EP2005/006104.

(Continued)

*Primary Examiner* — Ahshik Kim
(74) *Attorney, Agent, or Firm* — Bacon & Thomas, PLLC

(57) ABSTRACT

Proposed is a method for producing a portable data carrier (100) starting out from a film carrier (10) having disposed on its upper side (14) a contact layout (28), and on its underside (16) a semiconductor circuit (20) connected to the contact layout. The thus prepared film carrier (10) is put into an injection mold (30) where an injection molding process is performed in which a molded body (40) having an outer contour (102) corresponding to a standard specification for the outer dimensions of a portable data carrier is formed on the underside (16) around the semiconductor circuit (20).

3 Claims, 2 Drawing Sheets

FOREIGN PATENT DOCUMENTS

| | | |
|---|---|---|
| EP | 0 869 452 A1 | 10/1998 |
| EP | 0 923 047 A1 | 6/1999 |
| EP | 1 104 910 A1 | 6/2001 |

OTHER PUBLICATIONS

Rankl, W. and Effing, W. Smart Card Handbook (English Translation). p. 303-305 (1997).

Yahya Haghiri; Thomas Tarantino, Vom Plastik zur Chipkarte: Wegweiser zum Aufbau and zur Herstellung von Chipkarten, Abstract Page (1999).

W. Rankl; W. Effing. Handbuch der Chipkarten. Abstract Only (2002).

Communication issued in EP 05 751 648.6, Feb. 10, 2011, 5 pages.

* cited by examiner

METHOD FOR PRODUCING A PORTABLE DATA CARRIER

FIELD OF THE INVENTION

This invention relates to the production of portable data carriers and to corresponding data carriers. The invention relates particularly to the production of chip cards with outer dimensions smaller than the standardized dimensions of usual SIM cards.

BACKGROUND

A method according to the generic part of the main claim is known from DE 30 29 667 A1. Herein is described the production of an IC module for chip cards using injection molding technique. According to the method, a carrier film having on its up-per side a contact layout and on its underside contacting surfaces corresponding to the contact layout has a semiconductor circuit disposed thereon which is connected to the contacting surfaces. The semiconductor circuit is then molded in an injection mold with a molded body. The molded body is then punched-out of the carrier film and forms an IC module which can subsequently be mounted in a chip card. The known method is based on the concept of producing a chip card by first producing a chip module and then mounting it in a prepared card body.

This concept is the usual method for producing chip cards and is well described, e.g. in the book "Vom Plastik zur Chipkarte" by Y. Haghiri and T. Tarantino, Hanser-Verlag, Munich, 1999. For producing card bodies for chip cards, the book explains in detail the injection molding technique, among other things. Under the designation "in-mold technique" it describes an injection molding method by which a movable die having a previously produced chip module fastened to its head is placed in a mold such that the chip module protrudes into the mold cavity enclosed by the mold halves. The mold cavity with the chip module is then filled by injecting encapsulating material through a laterally disposed injection channel. The result is an injection molded card body with an embedded chip module.

U.S. Pat. No. 6,575,375 B1 further discloses a method for producing particularly small SIM modules by using an injection molding technique. Accordingly, a plurality of chip modules placed in a matrix array on a carrier film are put in an injection mold and overmolded so as to form a panel comprising the plurality of chip modules. The chip modules contained in the panel are then cut out so as to yield a data carrier in a desired form. The method combines favorable injection molding production with a great freedom of design for the data carriers to be produced. However, it requires the handling of an intermediate product not usual in the production of comparable data carriers and necessitates a corresponding adaptation of the machines and tools used.

In view of an increasing miniaturization of electronic terminals, ETSI (European Telecom Communications Standards Institute) is currently discussing the introduction of a new standard for chip cards, referred to hereinafter as "mini plug-in", which has further reduced dimensions compared with the standard for SIM cards.

SUMMARY

It is the problem of the invention to specify a simple method for producing portable data carriers that in particular allows production of chip cards with very small dimensions.

This problem is solved by a method having the features of the main claim. The inventive method has the advantage that very small portable data carriers are obtained without the intermediate step of a separate module production. The production does not require the milling of a module cavity, a laminating process for connecting a module to a card body, or an embedding process in an implanting apparatus. Corresponding machines are dispensed with and make production economical. The inventive method can advantageously be realized on the basis of the known in-mold technique. That the finished data carriers are produced directly on the film carrier facilitates their further handling. In particular, the data carriers can be coded and inscribed while still on the film carrier. Coding can be done with a usual chip function tester. The finished data carriers can also be delivered on the roll to a buyer, who then performs the singling step. The inventive method is suitable preferably for producing portable data carriers with an outer contour according to a standard specification for the outer dimensions of portable data carriers. In particular, it is suitable for producing data carriers according to the currently discussed mini plug-in standard for chip cards.

A portable data carrier produced according to the method is characterized by particular structural strength, since the semiconductor circuit is embedded directly in the body of the portable data carrier. This eliminates the problem of the strength of the connection between two separate components and accordingly the possibility of such a connection breaking.

BRIEF DESCRIPTION OF THE DRAWINGS

An embodiment of the inventive method will be explained more closely hereinafter with reference to the drawing.

The figures are described as follows.

DETAILED DESCRIPTION

Figure 1:
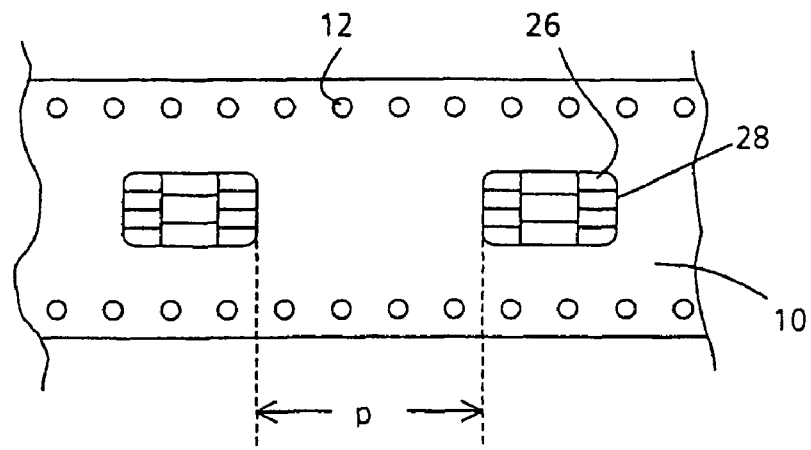
FIG. 1 a plan view of a film carrier with contact layouts formed thereon, from the upper side, FIG. 2 a longitudinal section through the film carrier shown in FIG. 1, FIG. 3 a portion of a film carrier with contact layout and semiconductor module placed in an injection mold, in a longitudinal section, FIG. 4 a molded body formed on a film carrier, and FIG. 5 a portable data carrier in a plan view from the contact layout side.

The starting material for the inventive production method is a film carrier 10 made of a rollable plastic-based carrier material and having perforations 12 on the sides for supporting transport during processing. The film carrier 10 has a thickness d; the material for the film carrier 10 is selected so as to form a good connection with a moldable encapsulating material, on the one hand, and have the qualities of a cover layer of a finished portable data carrier, on the other hand. The upper side of the film carrier 10 has contact layouts 28 with a plurality of single contact surfaces 26 formed thereon, as shown in FIG. 1. The contact layout 28 corresponds to a standard layout for chip cards according to ISO 7816. The underside 16 of the film carrier 10 has contacting surfaces 24 corresponding to the contact surfaces 26 of the contact layout 28 formed thereon for connecting a semiconductor circuit 20, which are connected to the contact surfaces 26 via suitable feedthroughs. Upon processing off the roll, a multiplicity of contact layouts 28 disposed at a distance p are located on a film carrier 10. However, the method can be carried out equally well with film carriers 10 each having exactly one contact layout 28 formed thereon.

On the underside of the film carrier 10 a semiconductor circuit 20 is disposed and electrically connected to the contacting surfaces 24 in each case. The semiconductor circuit 20 is a "chip" typical of chip cards, i.e. an integrated circuit produced by processing a wafer and as a rule having all features of a computer. Production of the chip and preparation of the film carrier 10 by applying contact layout, contacting surfaces and chip are known among experts and described in detail e.g. in the abovementioned book "Vom Plastik zur Chipkarte" or the book "Handbuch der Chipkarten" by W. Rankl, W. Effing, Hanser-Verlag, 4th edition. For details on carrying out the processing steps and on the structure and function of the integrated circuit, reference is therefore made to the relevant literature, in particular the stated books.

Figure 2:
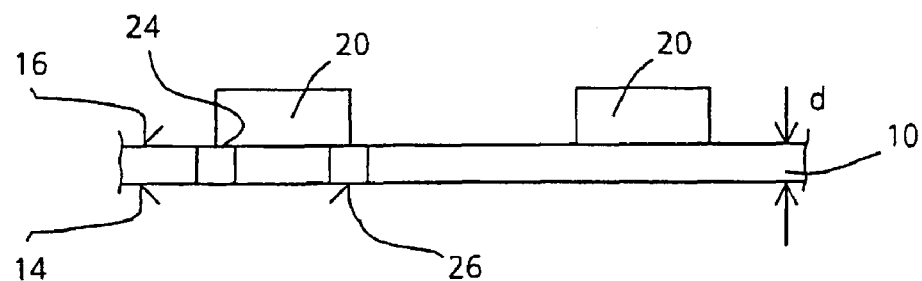
Figure 3:
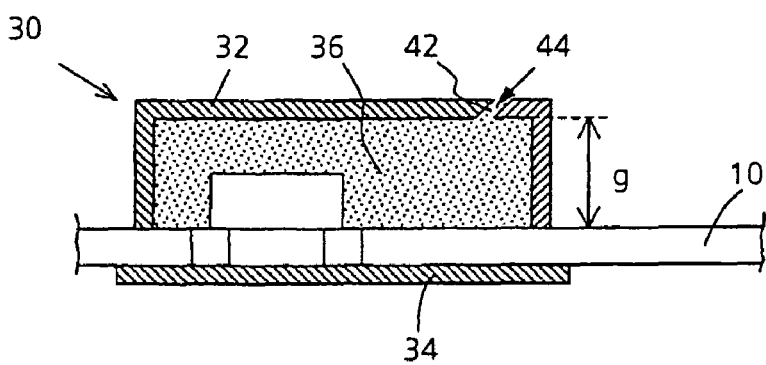
Figure 4:
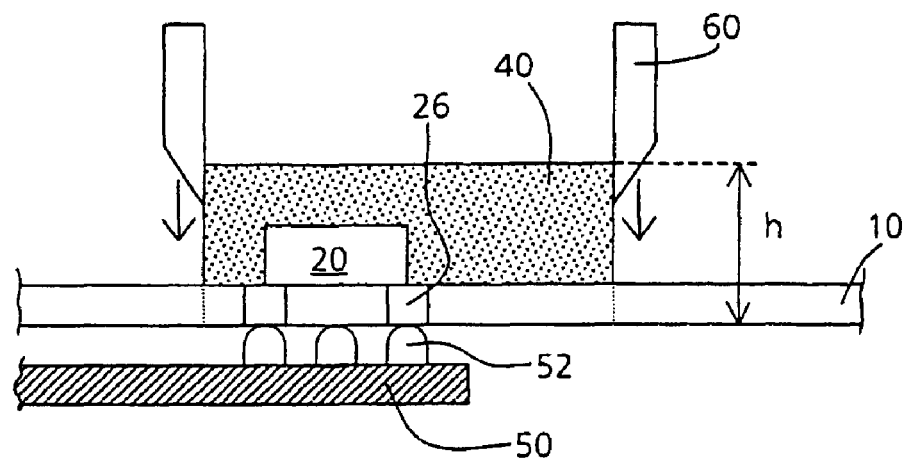

The film carrier 10 provided with the semiconductor circuit 20, as shown in FIG. 2, is subsequently processed further in an injection molding process. For this purpose, the film carrier 10 with the semiconductor circuit 40 is placed in the cavity 36 of an injection mold 30, as illustrated in FIG. 3. For the injection molding process to be performed on the roll, the distance p between two consecutive semiconductor circuits 20 on the film carrier 10 is at least greater than the longitudinal extension of the sealing edge of the injection mold 30 above the film carrier 10.

The injection mold 30 consists of two mold halves 32, 34, the lower mold half 34 lying against the upper side 14 of the film carrier 10 with the contact layout 28 and serving as a base. The upper mold half 32 rests tightly on the underside 12 of the film carrier 10 and encloses, while leaving a cavity 36, the semiconductor circuit 20 with contacting surfaces 24 and any further contacting structures present, e.g. in the form of bonding wires. In the upper mold half 32 an injection channel 42 is further located in the known way at a suitable place, through which encapsulating material 44 can be injected into the cavity 36.

Figure 5:
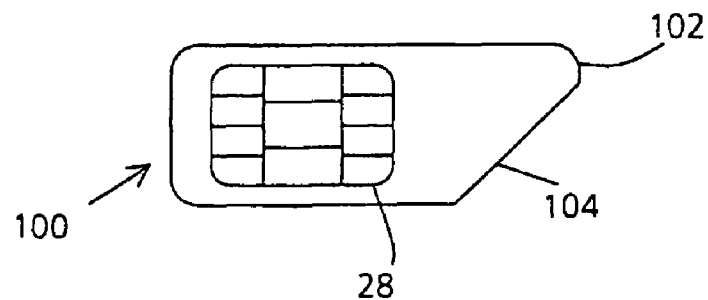

The cavity 36 enclosed by the upper mold half 32 has the final outer form desired for the finished portable data carrier, possibly corrected by a height deduction for the thickness d of the film carrier 10. The final form can be in particular a geometry with the—yet to be defined—standard dimensions currently being discussed by ETSI as a new mini plug-in format; FIG. 5 illustrates a possible outer form of such a portable data carrier 100 in a plan view. The mold halves 32, 34 are placed with respect to the contact layout 28 such that the contact layout 28 is located in the finished portable data carrier 100 exactly at the position stipulated by the standard to be applied. The inside height g of the cavity 36 corresponds to the final height h desired for the finished data carrier 100, reduced by the thickness d of the film carrier 10.

In the molding step itself, encapsulating material is introduced into the cavity 36 through the injection channel 42 and the cavity completely filled. Then the mold halves 32, 34 are removed. A molded body 40 with the outer contour of the finished data carrier 100 subsequently results on the film carrier 10.

The thus already largely finished portable data carrier 100 is then individualized. For this purpose, the molded body 40 with the semiconductor circuit 20 embedded therein is brought to a testing and personalization device 50. The latter has in particular a reading/writing device 52 with contact pins that hit the contact surfaces 26 to produce a data connection to the semiconductor circuit 20 disposed on the opposite side 16 of the film carrier 10. Via said data connection the semiconductor circuit 20 is then tested in the usual way and subsequently provided with individualizing data by writing e.g. a serial number.

The tested and individualized portable data carrier 100 is subsequently supplied to an inscribing station where it is inscribed or provided with graphic elements e.g. by means of a laser or by printing with an ink jet printer.

The steps of data individualization and subsequent inscription are expediently effected on the roll, i.e. while the molded bodies 40 are still connected to the film carrier 10. The perforations 12 permit simple motion of the film carrier 10 here.

The individualized data carrier 100 is thereupon singled. By means of a suitable tool 60, e.g. a punch die, the parts of the film carrier 10 located outside the molded body 40 are thereby removed. The part of the film carrier 10 connected to the molded body 40 remains on the molded body 40 and becomes the cover layer of the finished portable data carrier 100. As an alternative to punching, removal of the film carrier 10 can also be effected by cutting, by using a laser or by chemical singling.

The singling step can also be effected at an earlier time, i.e. before inscription or before individualizing in the personalization device. The further processing steps can then be carried out e.g. in the tray, i.e. the receptacle with depressions in which the data carriers 100 are located singly.

After singling, a finished portable data carrier 100 is immediately present, as indicated in FIG. 5 in a plan view. The outer contour 102 has typical geometric features stipulated by the relevant standard to be applied in the particular case, such as a cut off corner 104. The cover layer of the portable data carrier 100 with the contact layout 28 is formed by the material of the film carrier 10.

The singled portable data carrier 100 can then be subjected to further processing steps, if required. For example, it can be provided that after singling of the portable data carrier 100 a final personalization is effected and the portable data carrier 100 for this purpose supplied to a personalization device 50 for the first time or again.

The proposed method is particularly suitable when the contact layout 28 of a portable data carrier 100 to be produced has a similar size to the base area of the portable data carrier 100 itself, so that if the usual module mounting technique were used for producing the data carrier, only a wall with a mechanically unstable residual wall thickness would remain between contact layout 28 and outer contour 102. However, the method is also suitable as an alternative even when the use of the known module mounting technique would basically be applicable.

The above-described embodiments allow further implementation variants while retaining the basic inventive idea. Thus, the mold 30 can have more then two parts, or a plurality of injection molds 30 can be used on one film carrier simultaneously. While still on the roll, additional processing steps can further be performed on the data carrier to be produced. For example, a mechanical post-processing of the molded body 40 can be effected, or mechanical load tests carried out. To support singling of the data carriers by a buyer to whom the data carriers are then delivered on the roll, measures for preparing singling can be provided, e.g. by creating rated breaking lines along the outer contour of the data carriers.

The invention claimed is:
1. A method for producing a portable data carrier, comprising the steps:
   supplying a film carrier having a contact layout created on its upper side and contacting surfaces created on its underside;

disposing a semiconductor circuit on the underside and connecting the contacts of the semiconductor circuit to the contacting surfaces;

performing an injection molding process in which a molded body having an outer contour corresponding to a standard specification for the outer dimensions of a portable data carrier is formed on the underside around the semiconductor circuit;

supplying the film carrier with the semiconductor circuit located thereon, after production of the molded body, to a personalization device where an individualization of the semiconductor circuit is effected; and subsequently singling the portable data carrier by separating the part of the film carrier connected to the molded body from the remaining film carrier.

2. The method according to claim 1, wherein, for the injection molding process, a mold is used that has an upper mold half coming down on the film carrier and enclosing a cavity whose form corresponds to the stipulations of a standard specification for the outer dimensions of a portable data carrier.

3. The method according to claim 1, wherein the film carrier with the semiconductor circuit disposed thereon is supplied, after production of the molded body, to an inscription station where either or both the molded body and the part of the film carrier connected to the molded body is inscribed with either or both graphic and alphanumeric characters.

* * * * *